United States Patent [19]

Suzuki

[11] Patent Number: 5,288,832

[45] Date of Patent: Feb. 22, 1994

[54] POLY(SILETHYNYLENEDISILOXANE) AND METHOD FOR THE MANUFACTURE THEREOF

[75] Inventor: Toshio Suzuki, Kanagawa, Japan

[73] Assignee: Dow Corning Japan, Ltd., Tokyo, Japan

[21] Appl. No.: 9,488

[22] Filed: Jan. 25, 1993

[30] Foreign Application Priority Data

Jan. 31, 1992 [JP] Japan ..................................... 4-016656

[51] Int. Cl.$^5$ ............................................. C08G 77/04
[52] U.S. Cl. ........................................ 528/34; 528/35; 528/14; 528/15; 528/17; 528/18; 528/21
[58] Field of Search ..................... 528/34, 35, 18, 15, 528/17, 14, 21

[56] References Cited

U.S. PATENT DOCUMENTS

| | | |
|---|---|---|
| 2,887,371 | 5/1959 | Bennett et al. ........................... 71/2.3 |
| 3,249,630 | 5/1966 | Viche ................................. 260/429.7 |
| 3,418,385 | 12/1968 | Skinner et al. ........................ 260/665 |
| 3,520,948 | 7/1970 | Cuthill ................................... 528/35 |
| 3,699,140 | 10/1972 | Chandra et al. ................... 260/448.2 |
| 5,102,968 | 4/1992 | Bortolin et al. ......................... 528/14 |

*Primary Examiner*—Melvyn I. Marquis
*Attorney, Agent, or Firm*—James E. Bittell

[57] ABSTRACT

Silethynylenedisiloxane polymers are described with repeating units represented by —$R^1R^2SiC{\equiv}CSiR^3R^4OSiR^5R^6O$— where $R^1$–$R^6$ independently represent hydrogen atoms, alkyl groups, aryl groups, or alkenyl groups. The polymers are prepared by reacting a disilylacetylene compound represented by the formula $X^1R^1R^2SiC{\equiv}CSiR^3R^4X^1$ and a silane compound represented by the formula $X^2{}_2SiR^5R^6$ where $X^1$ and $X^2$ represent H, OH, OM, or a hydrolyzable group. $X^1$ and $X^2$ are not identical and are selected so that they undergo a condensation reaction to form a siloxane bond.

7 Claims, No Drawings

POLY(SILETHYNYLENEDISILOXANE) AND METHOD FOR THE MANUFACTURE THEREOF

BACKGROUND OF THE INVENTION

Field of the Invention

The present invention concerns novel organosilicon polymers and a method for their manufacture, more specifically poly(silethynylenedisiloxane) having alternating silethynylene units and siloxane units, such that the main skeleton of the polymer has repeating units of the formula —SiC≡CSiOSiO—.

There have been numerous reports of polymers with mainchain repeating units containing an ethynylene group (—C≡C—) bonded to a silicon atom. Also, there have been many reports of polymers having both a silicon-bonded ethynylene group and a siloxane group in the main-chain repeating units. For example, British Patent No. 2234517 disclosed a method for the manufacture of random copolymers of the —SiC≡C— unit and —SiO— unit using a lithium catalyst.

However, such conventional polymers lack regularity in structure. In particular, there have not been any reports on polymers consisting of completely alternating silethynylene unit and siloxane unit, such as —SiC≡CSiOSiO—, as the main skeleton. Here, it is an objective of the present invention to provide polymers with completely alternating silethynylene units and siloxane units, such as —SiC≡CSiOSiO—, as the main skeleton.

As a result of an intense investigation of ways to achieve such objectives, we have succeeded in synthesizing poly(silethynylenedisiloxane) with repeating units represented by the formula:

$$-R^1R^2SiC\equiv CSiR^3R^4OSiR^5R^6O- \qquad (I)$$

In the formula, $R^1$–$R^6$ independently represent hydrogen atoms, alkyl groups, aryl groups, or alkenyl groups.

SUMMARY OF THE INVENTION

The present invention comprises silethynylenedisiloxane polymers with repeating units represented by the formula —$R^1R^2SiC\equiv CSiR^3R^4OSiR^5R^6O$— where, $R^1$–$R^6$ independently represent hydrogen atoms, alkyl groups, aryl groups, or alkenyl groups. The polymer are prepared by reacting a disilylacetylene compound represented by the formula $X^1R^1R^2SiC\equiv CSiR^3R^4X^1$ and a silane compound represented by the formula $X^2{}_2SiR^5R^6$ where $X^1$ and $X^2$ represent H, OH, OM, or a hydrolyzable group and $X^1$ and $X^2$ may undergo a condensation reaction to form a siloxane bond.

DESCRIPTION OF THE INVENTION

The poly(silethynylenedisiloxanes) of the present invention are linear polymers having the unit represented by formula (I). As described above, the polymers of completely alternating silethynylene units —SiC≡CSi— and siloxane units, —OSiO— such as —those with —SiC≡CSiOSiO— as the main skeleton, are novel. Polymers of such structures have a high heat resistance and oxidation resistance, good electrical properties (insulation), processability, and strength, thus they are useful for coatings, films, and other applications.

For the poly(silethynylenedisiloxanes) of the present invention, there are no particular restrictions on the degree of polymerization (number of repeating units), while a degree of polymerization above 3 is preferred to display the needed properties of the polymers. Also, a degree of polymerization below 10,000 is preferred in terms of the processability and solubility in solvents.

The $R^1$–$R^6$ substituents bonded to the silicon atom can be chosen from a hydrogen atom; alkyl groups such as a methyl, ethyl, propyl, butyl, pentyl, hexyl, etc.; aryl groups such as a phenyl, tolyl, xylyl, mesityl, etc.; alkenyl groups such as a vinyl, allyl, propenyl, butenyl, etc., while a methyl group or phenyl group is preferred in economic terms. In particular, the silethynylene-siloxane copolymer containing a phenyl group as the substituent bonded to a silicon atom has excellent heat resistance, but there have not been any reports on random copolymers. $R^1$–$R^6$ usually have less than 20 carbon atoms.

The present invention provides a method for the manufacture of poly(silethynylenedisiloxane), with repeating units represented by formula (I), by reacting a disilylacetylene compound represented by the formula, $$X^1R^1R^2SiC\equiv CSiR^3R^4X^1 \qquad (II)$$

with a silane compound represented by the formula, $$X^2{}_2SiR^5R^6 \qquad (III)$$

In formulas (II) and (III), $X^1$ and $X^2$ represent hydrogen atoms, hydroxy groups, alkali-metal oxide groups of the formula —OM (where M is an alkali-metal atom) and hydrolyzable groups. The $X^1$ bonded to the silicon atom of compound (II) and the $X^2$ bonded to the silicon atom of formula (III) are selected from the above groups so that $X^1$ and $X^2$ may undergo a condensation reaction to form a siloxane bond. Here, to obtain alternating copolymers, it is necessary that $X^1$ and $X^2$ are not identical. For example, when $X^1$ is a hydroxy group, $X^2$ may be a hydrogen atom or a hydrolyzable group. When $X^1$ is a hydrogen atom or hydrolyzable group, $X^2$ is a hydroxy group. Similarly, combinations of the —OM group (M is an alkali metal such as lithium, potassium, sodium, etc.) and halogen atoms can be used.

Any conventionally known hydrolyzable groups may be used, e.g., a halogen atom; amino groups such as a dimethylamino group, diethylamino group, etc.; amide groups such as an N-methylacetamide group, benzamide group, etc.; aminoxy groups such as a dimethylaminoxy group, diethylaminoxy group, etc.; alkoxy groups such as a methoxy group, ethoxy group, propoxy group, butoxy group, etc.; acyloxy groups such as an acetoxy group, acryloxy group, etc.; alkenyloxy groups such as an isopropenyloxy group, etc.

The siloxane-formation reaction may be carried out in a solvent or without a solvent. To obtain polymers with high molecular weights, using a small amount of solvent is preferred. Any solvent that dissolves the compounds of formulas (II) and (II) and the polymer formed, and shows no adverse effects on the reaction, can be used. The solvents are aliphatic hydrocarbons such as pentane, hexane, heptane, octane, etc.; aromatic hydrocarbons such as benzene, toluene, xylene, etc.; ethers such as diethyl ether, dibutyl ether, diphenyl ether, dioxane, tetrahydrofuran, etc.; esters such as ethyl acetate, butyl acetate, etc.; ketones such as acetone, methyl ethyl ketone, methyl butyl ketone, etc.; halogenated solvents such as carbon tetrachloride, chloroform, trichloroethane, trichloroethylene, tetrachloroethylene, etc.; dimethylformamide; dimethyl sulfoxide; and hexamethylphosphoric triamide.

While not restricted in any particular way, the siloxane-formation reaction between compounds (II) and compound (III) may be carried out from a low temperature of $-80°$ C. to a high temperature of 200° C., but an excessively high temperature may cause thermal polymerization of the ethynylene group, thus it is not favored. Any pressure ranging from vacuum pressure to a high pressure may be used.

Good results are obtained from reactions carried out in the presence of a catalyst and an acid or base scavenger. For example, when $X^1$ is a hydrogen atom and $X^2$ is a hydroxy group (or vice versa), catalysts effective for dehydrogenation, such as compounds containing metal atoms like tin, titanium, palladium, etc., alkali catalysts, and amines are preferred. When $X^1$ is a hydrolyzable group, especially a halogen atom, and $X^2$ is a hydroxy group (or vice versa), the addition of the compounds scavenging the hydrogen halide formed, such as amines, e.g., triethylamine, pyridine, etc., alkaline compounds, e.g., sodium hydroxide, sodium carbonate, sodium bicarbonate, potassium hydroxide, etc., is preferred.

The polymers obtained with the unreacted $X^1$ and $X^2$ terminals may be used without further modification or may be treated with alcohols, etc., for reduced reactivity. As explained above, the poly(silethynylenedisiloxane) compounds represented by formula (I) of the present invention are novel polymers, which are heat-resistant and useful in coatings, adhesives, films, structural materials, etc.

Next, the present invention is explained and demonstrated with examples. In the examples, the weight-average molecular weight was determined by gel permeation chromatography (GPC) with poly(dimethylsiloxane) as standard. $^{29}$Si-NMR means silicon 29 nuclear magnetic resonance, with tetramethylsilane used as the external standard, at 0 ppm.

EXAMPLE 1

In a flask, 40 mL of tetrahydrofuran and 4.22 g (0.01 mol) of bis(hydroxydiphenylsilyl)acetylene were added, then the resulting mixture was stirred in an argon atmosphere with the flask cooled to 0° C., while a solution of 3.26 g (0.01 mol) of bis(N-methylacetomido)diphenylsilane in tetrahydrofuran (20 mL) was slowly added dropwise. After the reaction, the mixture was poured into 1 L of methanol to obtain a white polymer precipitate.

Yield 93%. Weight-average molecular weight 6300. $^{29}$Si-NMR, $-38.1$ ppm, $-43.6$ ppm, repeating unit: $-Ph_2SiC\equiv CSiPh_2OSiPh_2O-$ (Ph=phenyl group)

EXAMPLE 2

In a flask, 60 mL of tetrahydrofuran and 9.78 g (0.03 mol) of bis(N-methylacetamido)diphenylsilane were added, then the resulting mixture was stirred in an argon atmosphere with the flask cooled to 0° C., while a solution of 12.66 g (0.03 mol) of bis(hydroxydiphenylsilyl)acetylene in tetrahydrofuran (120 mL) was slowly added dropwise. After the reaction, the mixture was poured into 1000 mL of methanol to obtain a white polymer precipitate.

Yield 95%. Weight-average molecular weight 20,000. $^{29}$Si-NMR, $-38.1$ ppm, $-43.6$ ppm, repeating unit: $-Ph_2SiC\equiv CSiPh_2OSiPh_2O-$ (Ph=phenyl group)

EXAMPLE 3

In a flask, 30 mL of tetrahydrofuran, 4.6 g (0.01 mol) of bis(chlorodiphenylsilyl)acetylene, and 3.0 g (0.03 mol) of triethylamine were added, then and the resulting mixture was stirred in an argon atmosphere with the flask cooled to 0° C., while a solution of 2.16 g (0.01 mol) of diphenylsilanediol in tetrahydrofuran (20 mL) was slowly added dropwise. After the reaction, the mixture was poured into 400 mL of methanol to obtain a light reddish white polymer precipitate.

Yield 48%. Weight-average molecular weight 2200. $^{29}$Si-NMR showed a skeletal structure similar to that of the polymer obtained in Example 1.

EXAMPLE 4

In a flask, 50 mL of tetrahydrofuran and 2.3 g (0.01 mol) of diphenylsilanediol lithium salt were added, then the resulting mixture was stirred in an argon atmosphere with the flask cooled to 20° C., while a solution of 4.6 g (0.01 mol) of bis(diphenylchlorosilyl)acetylene in tetrahydrofuran (30 mL) was slowly added dropwise. After the reaction, the mixture was washed 3 times with a saturated ammonium chloride aqueous solution. Then solvent was removed from the organic layer by distillation and the residue poured into 500 mL of methanol to obtain a white polymer precipitate.

Yield 55%. Weight-average molecular weight 2200. $^{29}$Si-NMR showed a skeletal structure similar to that of the polymer obtained in Example 1.

EXAMPLE 5

In a flask, 20 mL of triethylamine and 3.35 g (0.01 mol) of bis(methylphenylchlorosilyl)acetylene were added, then the resulting mixture was stirred in an argon atmosphere with the flask cooled to 0° C., while a solution of 2.16 g (0.01 mol) of diphenylsilanediol in tetrahydrofuran (20 mL) was slowly added dropwise. After the addition was completed, the mixture was stirred at 50° C. for 2 h, then the pasty mixture was dissolved in 100 mL of diethyl ether and washed several times with water. The solvent was removed by distillation and the residue poured into 500 mL of methanol to obtain a highly viscous brown oily polymer precipitate.

Yield 40%. Weight-average molecular weight 2500. $^{29}$Si-NMR, $-27.6$ ppm, $-44.4$ ppm, repeating unit: $-MePhSiC\equiv CSiPhMeOSiPh_2O-$ (Me=methyl group; Ph=phenyl group)

EXAMPLE 6

In a flask, 30 mL of tetrahydrofuran and 2.30 g (0.01 mol) of bis(N-ethylacetamido)dimethylsilane were added, then the resulting mixture was stirred in an argon atmosphere with the flask cooled to 10° C., while a solution of 4.22 g (0.01 mol) of bis(hydroxydiphenylsilyl)acetylene in tetrahydrofuran (30 mL) was slowly added dropwise. After the reaction, the mixture was poured into 600 mL of methanol to obtain a light-brown solid polymer precipitate.

Yield 71%. Weight-average molecular weight 23,000. $^{29}$Si-NMR, $-14.7$ ppm, $-39.6$ ppm, repeating unit: $-Ph_2SiC\equiv CSiPh_2OSiMe_2O-$ (Me=methyl group, Ph=phenyl group)

The invention claimed is:

1. Poly(silethynylenedisiloxane) with a degree of polymerization of 3 to 10,000 and with repeating units represented by the formula:

$-R^1R^2SiC\equiv CSiR^3R^4OSiR^5R^6O-$ where $R^1$-$R^6$ independently represent hydrogen atoms, alkyl groups, aryl groups, or alkenyl groups.

2. The poly(silethynylenedisiloxane) of claim 1, wherein R1-R6 represent methyl or phenyl groups.

3. The poly(silethynylenedisiloxane) of claim 2, wherein R1-R6 represent phenyl groups.

4. A method for the manufacture of poly(silethynylenedisiloxane), the method comprising:

reacting a disilylacetylene compound represented by the formula, $X^1R^1R^2SiC\equiv CSiR^3R^4X^1$ with a silane compound represented by the formula, $X^2{}_2SiR^5R^6$ to form poly(silethynylenedisiloxane) with a degree of polymerization of 3 to 10,000 and with repeating units represented by the formula:

$-R^1R^2SiC\equiv CSiR^3R^4OSiR^5R^6O-$ where $R^1$-$R^6$ independently represent hydrogen atoms, alkyl groups, aryl groups, or alkenyl groups and $X^1$ represents a hydroxy group or alkali metal oxide group of the formula —OM where M is an alkali-metal atom, and $X^2$ represents a chlorine atom or amide group.

5. The method of claim 4, wherein each $R^1$, $R^2$, $R^3$, and $R^4$ represents a phenyl group and $X^1$ represents a hydroxy group or —OLi group.

6. A method for the manufacture of poly(silethynylenedisiloxane), the method comprising:

reacting a disilylacetylene compound represented by the formula, $X^1R^1R^2SiC\equiv CSiR^3R^4X^1$ with a silane compound represented by the formula, $X^2{}_2SiR^5R^6$ to form poly(silethynylenedisiloxane) with a degree of polymerization of 3 to 10,000 and with repeating units represented by the formula:

$-R^1R^2SiC\equiv CSiR^3R^4OSiR^5R^6O-$ where $R^1$-$R^6$ independently represent hydrogen atoms, alkyl groups, aryl groups, or alkenyl groups and $X^1$ represents a halogen atom, amino group, amide group, alkoxy group, acyloxy group, or alkenyloxy group and $X^2$ represents a hydroxy group or an alkali metal oxide group of the formula —OM where M is an alkali-metal atom.

7. The method of claim 6, wherein $X^1$ represents a chlorine atom or amide group, $X^2$ represents a hydroxy group or —OLi group, wherein each $R^5$ and $R^6$ represent a phenyl group.

* * * * *